US008111297B2

(12) United States Patent
Nitta

(10) Patent No.: US 8,111,297 B2
(45) Date of Patent: Feb. 7, 2012

(54) IMAGE PROCESSING APPARATUS, PROGRAM, AND METHOD FOR PERFORMING PREPROCESSING FOR MOVIE REPRODUCTION OF STILL IMAGES

(75) Inventor: Keiichi Nitta, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/801,622

(22) Filed: Jun. 17, 2010

(65) Prior Publication Data

US 2010/0260469 A1     Oct. 14, 2010

Related U.S. Application Data

(62) Division of application No. 11/229,747, filed on Sep. 20, 2005, now Pat. No. 7,764,310.

(30) Foreign Application Priority Data

Sep. 22, 2004    (JP) .................................. 2004-276063

(51) Int. Cl.
*H04N 5/225*     (2006.01)
*H04N 5/228*     (2006.01)

(52) U.S. Cl. ................ 348/220.1; 348/208.13; 348/239; 348/333.12

(58) Field of Classification Search ................ 348/220.1
See application file for complete search history.

(56) References Cited

U.S. PATENT DOCUMENTS

| 4,862,266 | A |   | 8/1989  | Gillard            |
|-----------|---|---|---------|--------------------|
| 5,455,689 | A | * | 10/1995 | Taylor et al. ................ 358/450 |
| 5,943,096 | A |   | 8/1999  | Choo               |
| 6,137,947 | A |   | 10/2000 | Ohta et al.        |
| 6,151,075 | A |   | 11/2000 | Shin et al.        |
| 6,947,082 | B2| * | 9/2005  | Gomi .......................... 348/240.2 |
| 7,180,548 | B2|   | 2/2007  | Mishima et al.     |
| 7,242,850 | B2| * | 7/2007  | Cok ................................ 386/73 |
| 7,557,833 | B2|   | 7/2009  | Okawa              |
| 2002/0135686 | A1 |   | 9/2002  | Kuroiwa         |
| 2002/0149696 | A1 | * | 10/2002 | Cok et al. ....................... 348/459 |
| 2003/0161407 | A1 |   | 8/2003  | Murdock et al.  |
| 2004/0101058 | A1 |   | 5/2004  | Sasai et al.    |
| 2004/0165785 | A1 |   | 8/2004  | Monobe et al.   |

(Continued)

FOREIGN PATENT DOCUMENTS

EP     0 294 959 A2    12/1988

(Continued)

OTHER PUBLICATIONS

Jan. 17, 2006 Search Report issued in European Patent Application No. 05020594.7.

(Continued)

*Primary Examiner* — Ngoc-Yen Vu
(74) *Attorney, Agent, or Firm* — Oliff & Berridge, PLC

(57) ABSTRACT

An apparatus takes in a plurality of still image frames, to generate an interpolated image frame. Next, moving addition of the still image frame and an interpolated image frame is performed in time-axis direction, to generate a superimposed image frame. At this time, high spatial frequency components in the superimposed image frame are suppressed strongly as alienation of motion between the still image frames becomes larger. Movie is reproduced by sandwiching these superimposed image frames between the still image frames. As a result of this, the movie reproduction with smooth motion is made possible even from a group of the still images photographed by an electronics still camera and the like.

9 Claims, 5 Drawing Sheets

U.S. PATENT DOCUMENTS

| | | |
|---|---|---|
| 2006/0061672 A1 | 3/2006 | Nitta |
| 2006/0285019 A1 | 12/2006 | Matschullat |
| 2008/0226197 A1 | 9/2008 | Saga |

FOREIGN PATENT DOCUMENTS

| | | |
|---|---|---|
| EP | 0 903 946 A1 | 3/1999 |
| EP | 1 237 370 A2 | 9/2002 |
| EP | 1 401 210 A1 | 3/2004 |
| EP | 1 455 536 A1 | 9/2004 |
| GB | 2 264 416 A | 8/1993 |
| JP | A-06-261243 | 9/1994 |
| JP | A-09-116852 | 5/1997 |
| JP | A-10-257435 | 9/1998 |
| JP | A-2000-295568 | 10/2000 |
| JP | A-2001-111934 | 4/2001 |
| JP | A-2002-330335 | 11/2002 |
| JP | A-2002-359778 | 12/2002 |
| JP | A-2003-085591 | 3/2003 |
| JP | A-2003-134512 | 5/2003 |
| JP | 2003-244659 * | 8/2003 |
| JP | A-2003-244659 | 8/2003 |
| JP | A-2004-005344 | 1/2004 |
| JP | A-2006-094058 | 4/2006 |
| JP | A-2007-096724 | 4/2007 |
| WO | WO 01/01698 A1 | 1/2001 |
| WO | WO 2004/004310 A2 | 1/2004 |

OTHER PUBLICATIONS

Jun. 13, 2008 Office Action issued in U.S. Appl. No. 11/229,747.
Oct. 15, 2008 Office Action issued in U.S. Appl. No. 11/229,747.
Jul. 7, 2009 Office Action issued in U.S. Appl. No. 11/229,747.
Oct. 27, 2009 Office Action issued in Japanese Patent Application No. 2004-276063.
Mar. 18, 2010 Notice of Allowance issued in U.S. Appl. No. 11/229,747.
Aug. 4, 2010 Office Action issued in European Patent Application No. 05 020 594.7.
Nov. 12, 2010 Office Action issued in U.S. Appl. No. 12/654,059.
International Preliminary Report on Patentability issued on Feb. 24, 2010 in corresponding International Application No. PCT/JP2008/001482.
U.S. Appl. No. 12/654,059, filed Dec. 9, 2009.
U.S. Appl. No. 12/692,196, filed Jan. 22, 2010.
Jun. 21, 2011 Office Action issued in U.S. Appl. No. 12/654,059.
Aug. 25, 2011 Summons to Attend Oral Proceedings issued in European Patent Application No. 05020594.7.
A. V. Oppenheim, "Signals and Systems," pp. 414-419, Chapter 6, Sec. 6.4, Examples of Discrete-Time Frequency-Selective Filters, Prentice Hall Int. Editions, 1983, USA.

* cited by examiner

FIG. 4
BLOCK MATCHING
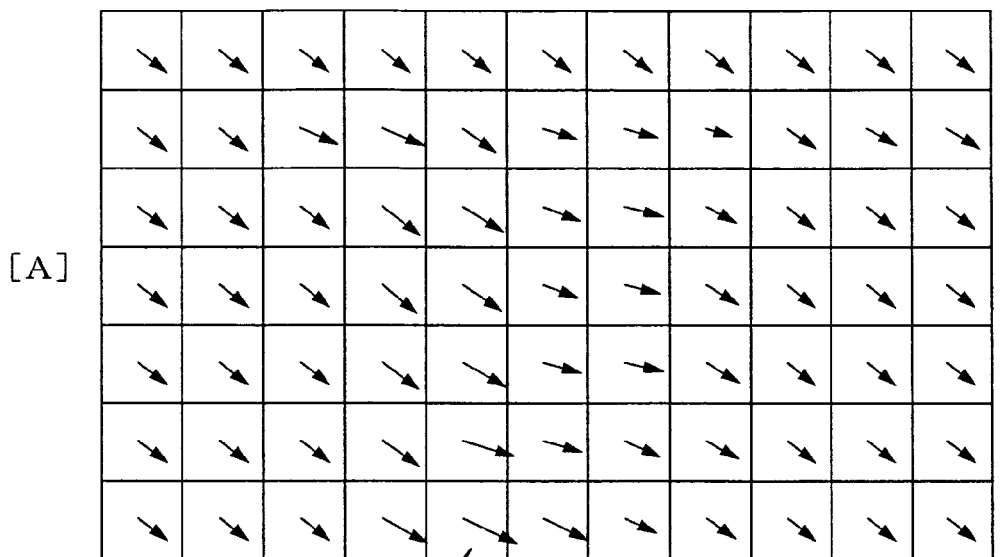
[A]
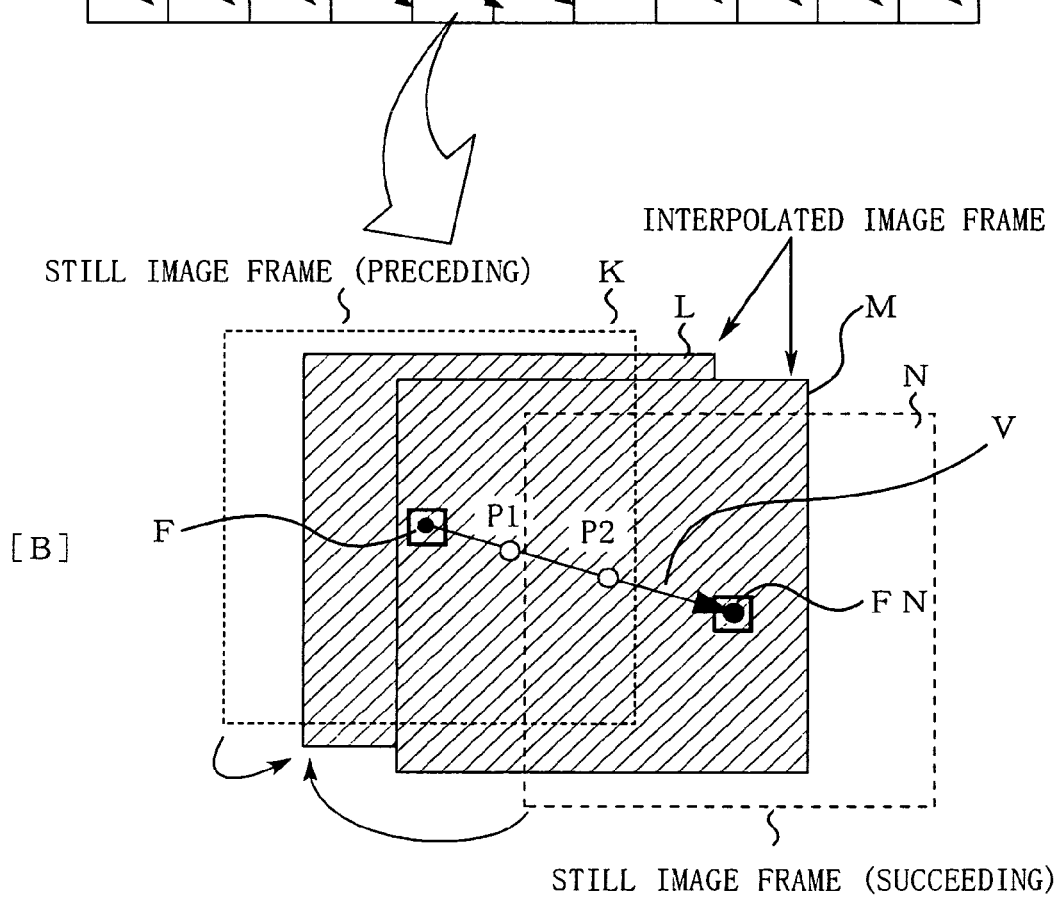
[B]

IMAGE PROCESSING APPARATUS, PROGRAM, AND METHOD FOR PERFORMING PREPROCESSING FOR MOVIE REPRODUCTION OF STILL IMAGES

This is a Division of application Ser. No. 11/229,747 filed Sep. 20, 2005. The disclosure of the prior application is hereby incorporated by reference herein in its entirety.

CROSS REFERENCE TO RELATED APPLICATION

This application is based upon and claims the benefit of priority from Japanese Patent Application No. 2004-276063, filed on Sep. 22, 2004, the entire contents of which are incorporated herein by reference.

BACKGROUND OF THE INVENTION

1. Field of the Invention

The present invention relates to an image processing technique that displays a plurality of still images as smooth movie.

2. Description of the Related Art

A conventionally known technique sequentially reproduces frame-by-frame a plurality of still image frames which are photographed by an electronic camera, with the operation of a frame step button by the user (for example, Japanese Unexamined Patent Application Publication No. Hei 9-116852 and the like).

Incidentally, the present inventor has considered realizing fine movie reproduction by using the plural still image frames which are continuously photographed as his or her material. When such a function is realized, images stored as the still images can be disclosed as movies in electronic albums or websites on the Internet, which makes image appreciation even more enjoyable.

Moreover, when the plural still image frames are reproduced as a movie image by a image editing software or the like, it is possible to view a vast number of still images in a short period of time. Additionally, it is also possible to quickly find a desired still image from the vast number of the still images by this movie reproduction.

In such a movie reproduction, approximately 18 to 30 image frames per second are generally necessary in order to display smooth motion like in films or television programs.

Meanwhile, when the above-described electronic camera performed still-image photographing, its photographing intervals were approximately 2 to 8 frames per second, even with a continuous photographing mode whose speed is relatively high. When the still images having such photographing intervals were simply reproduced frame-by-frame, motion of the images became awkward and hence fine movie reproduction was difficult.

Further, still images are often photographed by controlling image blurring so as to be suitable for still image appreciation. When the still images with less image blurring are simply reproduced frame-by-frame, a linkage of motion is hardly established between the images and movie reproduction becomes awkward.

SUMMARY OF THE INVENTION

Therefore, it is an object of the present invention to provide an image processing technique that realizes fine movie reproduction by using, as materials, still images with long photographing intervals and the still images with less blurring which are suitable for appreciation as the still images.

Hereinafter, an explanation on the present invention will be given.

(1) An image processing apparatus according to the present invention executes preprocessing to smoothly perform a movie display of image data composed of a plurality of still image frames obtained by still-image photographing, including an image inputting unit, a frame interpolating unit, a superimposing unit, and a smoothing unit.

The image inputting unit imports the plurality of the still image frames.

The frame interpolating unit applies frame interpolation to the plurality of the still image frames in time-axis direction in order of photographing, to generate an interpolated image frame.

The superimposing unit performs moving addition of either one of "the still image frame and the interpolated image frame" and "a plurality of the interpolated image frames with each other" in the time-axis direction, to generate a superimposed image frame.

The smoothing unit increases smoothness of the movie display by suppressing more high spatial frequency components in the superimposed image frame as alienation of motion between the still image frames becomes larger.

(2) Preferably, the smoothing unit increases the smoothness of the movie display by suppressing more of the high spatial frequency components in the superimposed image frame as a charge storage time at the time of photographing the still image frame becomes shorter.

(3) Preferably, the smoothing unit increases the smoothness of the movie display by suppressing more of the high spatial frequency components in the superimposed image frame as a photographing interval of the still image frame becomes longer.

(4) Preferably, the smoothing unit increases the smoothness of the movie display by suppressing more of the high spatial frequency components in the superimposed image frame as a moving amount (motion amount) of the image between the still image frames becomes larger.

(5) Preferably, the smoothing unit suppresses more of the high spatial frequency components in the superimposed image frame as a maximum motion amount among the motion found from a plurality of places in an image area becomes larger.

(6) Preferably, the smoothing unit increases the smoothness of the movie display by increasing a number of the frames of the interpolated image frames which the frame interpolating unit generated, and by suppressing the high spatial frequency components in the superimposed image frame.

(7) Preferably, the smoothing unit increases the smoothness of the movie display by increasing a number of frames to be performed moving addition, and by suppressing the high spatial frequency components in the superimposed image frame.

(8) Preferably, the smoothing unit further increases the smoothness of the movie display by applying smoothing filter over the superimposed image frame that has been performed moving addition.

In this case, a cutting off of lower frequencies in a high-frequency cutoff characteristic of the smoothing filter in the superimposed image frame is performed as the alienation of motion becomes larger.

Alternatively, an increasing of a high spatial frequency cutoff amount of the smoothing filter it the superimposed image frame is performed as the alienation of motion becomes larger.

(9) Further preferably, the smoothing unit applies a smoothing filter that performs smoothing on a direction of the motion vector between frames over the superimposed image frame.

(10) Preferably, the smoothing unit increases the smoothness of the movie display by commonly using either one of the still image frame and the interpolated image frame when generating the superimposed image frames which are temporally adjacent to each other.

(11) Preferably, the smoothing unit increases the smoothness of the movie display by increasing a number of either one of the still image frame and the interpolated image frame to be used commonly, and by suppressing the high spatial frequency components in the superimposed image frame, when generating the superimposed image frames which are temporally adjacent to each other.

(12) Preferably, the image processing apparatus further includes a recording unit recording, as a movie image file, a movie being completed.

(13) Preferably, the smoothing unit includes a compression unit that compresses data of said movie being completed and supplies the compressed image data to the recording unit. This compression unit, according to the alienation of motion, generates the compressed image data by performing a high-frequency cutoff processing in the superimposed image frame when compression-encoding the superimposed image.

(14) Another image processing apparatus according to the present invention executes preprocessing to smoothly perform a movie display of image data composed of a plurality of still image frames obtained by still-image photographing, including an image inputting unit, a frame interpolating unit, a superimposing unit, and a smoothing unit.

The image inputting unit imports the plurality of the still image frames.

The frame interpolating unit applies frame interpolation to the plurality of the still image frames in time-axis direction in order of photographing, to generate an interpolated image frame.

The superimposing unit performs moving addition of either one of "the still image frame and the interpolated image frame" and "the plurality of the interpolated image frames with each other" in the time-axis direction, to generate a superimposed image frame.

The smoothing unit increases smoothness of the movie display by suppressing more high spatial frequency components in the superimposed image frame as a display rate of the movie display becomes lower.

(15) The smoothing unit further increases the smoothness of the movie display by applying smoothing filter that performs smoothing on a direction of the motion vector between frames over the superimposed image that has been performed moving addition.

In this case, a cutting off of lower frequencies in a high-frequency cutoff characteristic of the smoothing filter in the superimposed image frame is performed as display frame rate becomes lower. Alternatively, an increasing of a high spatial frequency cutoff amount of the smoothing filter in the superimposed image frame is performed as the display frame rate becomes lower.

(16) Another image processing apparatus according to the present invention executes preprocessing to smoothly perform a movie display of image data composed of a plurality of still image frames obtained by still-image photographing, including an image inputting unit, a frame interpolating unit, a superimposing unit, and a smoothing unit.

The image inputting unit imports the plurality of the still image frames.

The frame interpolating unit applies frame interpolation to the plurality of the still image frames in time-axis direction in order of photographing, to generate an interpolated image frame.

The superimposing unit performs moving addition of either one of "the still image frame and the interpolated image frame" and "the plurality of the interpolated image frames with each other" in the time-axis direction, to generate a superimposed image frame.

The smoothing unit increases smoothness of the movie display by suppressing more high spatial frequency components in the superimposed image frame as display zoom magnification of the movie display becomes higher.

(17) A computer-executable image processing program according to the present invention allows a computer to function as the image inputting unit, the frame interpolating unit, the superimposing unit, and the smoothing unit.

(18) An image processing method according to the present invention executes preprocessing to smoothly perform a movie display of image data composed of a plurality of still image frames obtained by still-image photographing, including the following steps.

(Step 1) The step importing the plurality of the still image frames.

(Step 2) The step applying frame interpolation to the plurality of the still image frames in time-axis direction in order of photographing, to generate an interpolated image frame.

(Step 3) The step performing moving addition of the still image frame and the interpolated image frame in the time-axis direction, to generate superimposed images frame sequentially.

(Step 4) The step increasing smoothness of the movie display by suppressing more high spatial frequency components in the superimposed image frame as alienation of motion between the still image frames becomes larger.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 4A and 4B are views explaining detection of motion vectors and a generating operation of interpolated image frames.

DESCRIPTION OF THE PREFERRED EMBODIMENTS

Hereinafter, a preferred embodiment of the present invention will be explained in detail based on the drawings.
(Structural Explanation of this Embodiment)

Figure 1:
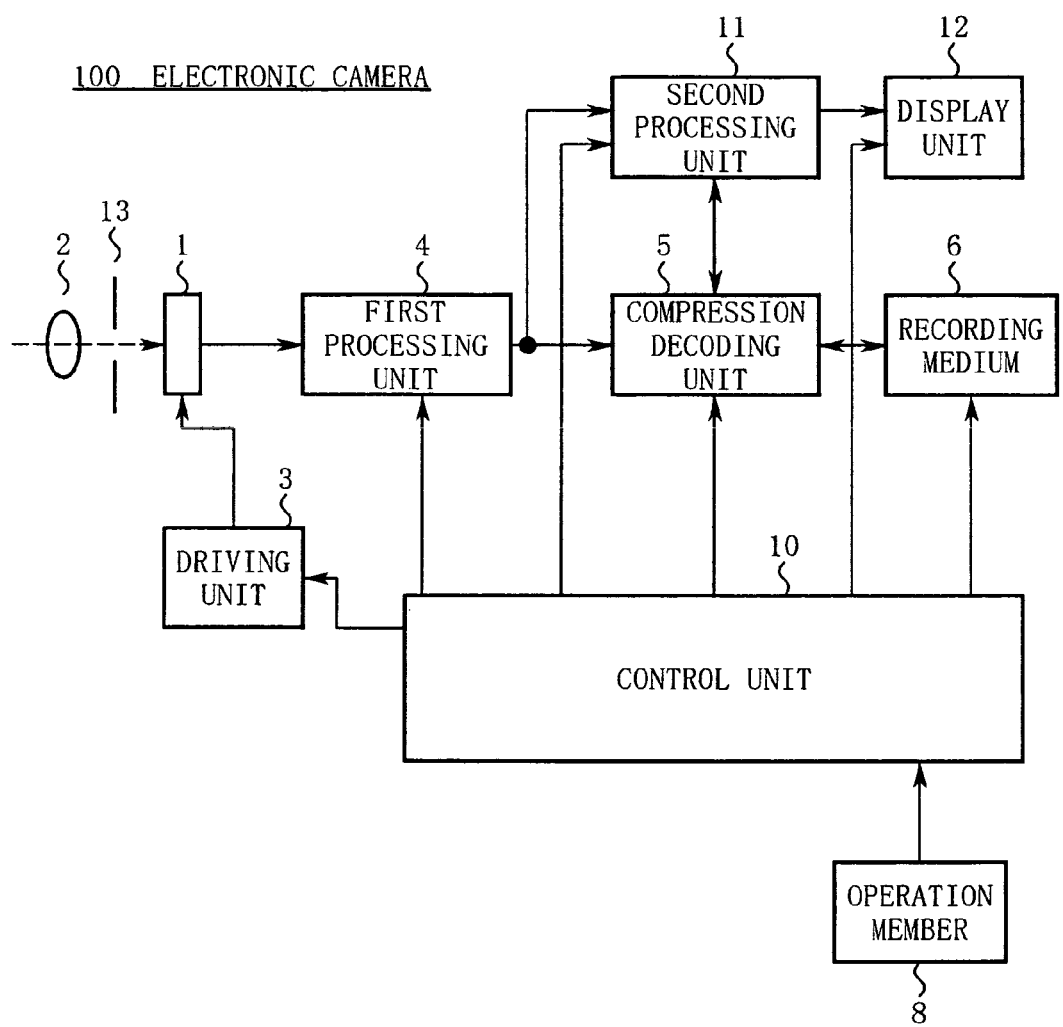
FIG. 1 is a block diagram showing an electronic camera 100 in the embodiment.

FIG. 1 is a block diagram showing an electronic camera 100 (including an image processing apparatus) according to the present embodiment.

As shown in FIG. 1, a lens 2 is attached to the electronic camera 100. Passing luminous flux of this lens 2 forms an image of a subject on an image sensor 1 via an aperture 13. This image sensor 1 is driven by a drive pulse from a driving unit 3 to thereby output image data of a still image frame.

This image data is inputted into a first processing unit 4 and subjected to signal processing such as A/D conversion, white balance, gamma conversion, and electronic zoom.

Image data outputted from the first processing unit 4 is subjected to image compression processing in a compression decoding unit 5 to be converted into compressed data. This compressed data is combined with attendant information such as storage time information of the image sensor 1 and a photographing time, and recorded successively as a still image file on a recording medium 6.

The still image file recorded on the recording medium 6 is decoded by the compression decoding unit 5, and given to a second processing unit 11 as image data of the still image frame. Incidentally, it is also possible that the second processing unit 11 directly receives the image data which is processed in the first processing unit 4.

In this second processing unit 11, image processing for reproduction is performed according to an operation mode. When it is set to a still image movie mode, for example, the second processing unit 11 applies image processing of movie processing mode, which will be described later, to a image data group of the still image frames, to generate superimposed image frames for displaying the movie. These superimposed image frames are reproduced and displayed on a display unit 12 as the movie. Further, these superimposed image frames are subjected to the image compression in the compression decoding unit 5, and then recorded on the recording medium 6 as a movie file.

In addition, a control unit 10 and an operation member 8 are provided to the electronic camera 100 so as to perform setting operation, system control and the like of the electronic camera 100.

Incidentally, the display unit 12 and the recording medium 6 may be provided separately as external devices of the electronic camera 100. In this case, the display unit 12 and the recording medium 6 have signal connection with the electronic camera 100 by cable splicing and radio interfaces.

(Explanation of Imaging Operation of Electronic Camera 100)

Figure 2:
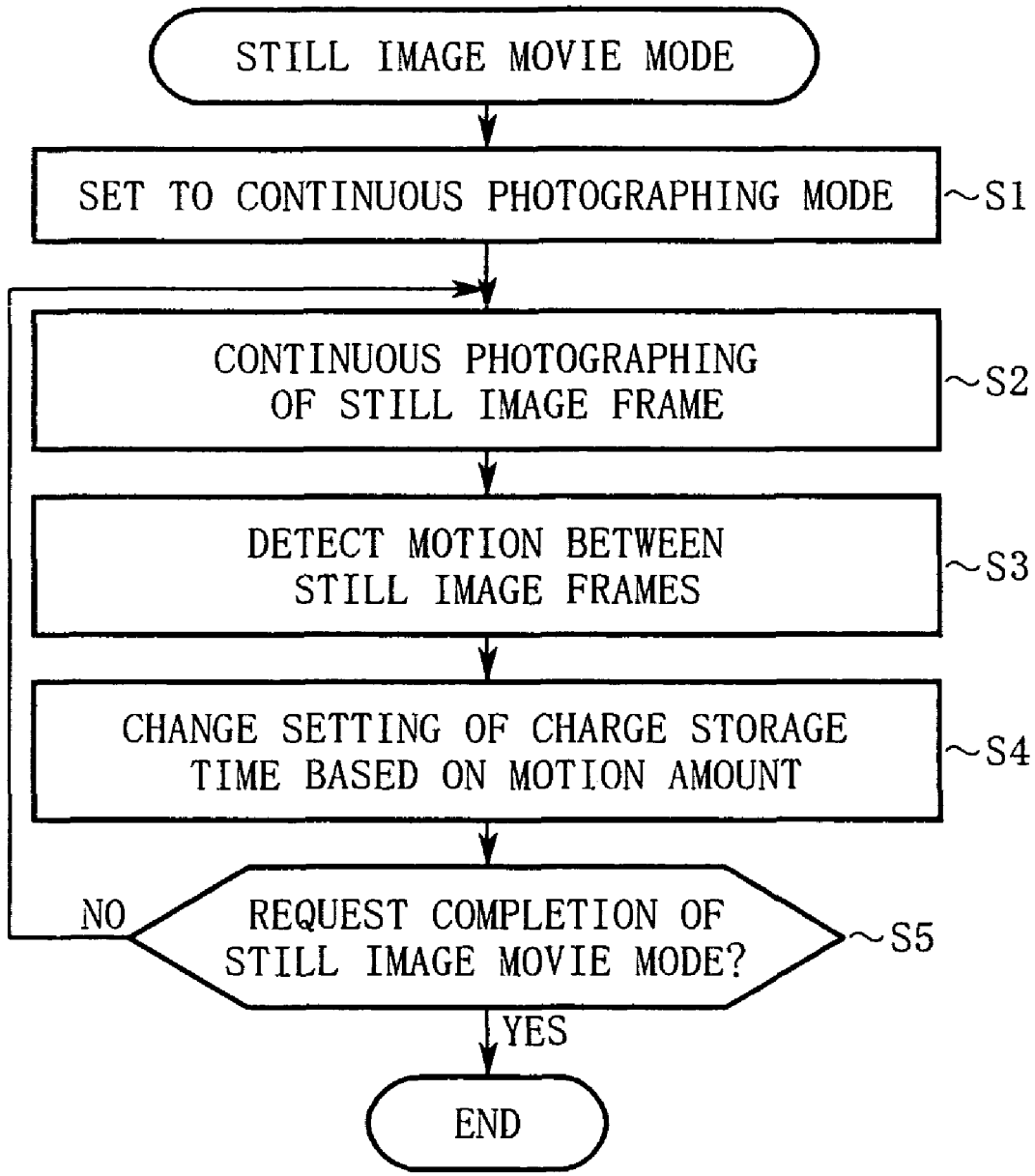
FIG. 2 is an operation flowchart of a still image movie mode of the electronic camera 100.

FIG. 2 is an operation flowchart of the still image movie mode of the electronic camera 100.

Hereinafter, the operation of the still image movie mode will be explained according to step numbers shown in FIG. 2.

Step S1: When the control unit 10 receives the operation to start photographing from the operation member 8 (release button), it instructs the driving unit 3 to perform continuous photographing.

Step S2: The driving unit 3 performs shutter control by giving a predetermined charge storage time to the image sensor 1 in order to obtain a fine still image which has less blurring and can be appreciated as the still image, to generate a still image frame. The shutter control in this case may be either electronic shutter control or mechanical shutter control. The driving unit 3 repeats this generating operation of the still image frame at such photographing intervals that a processing buffer in the first processing unit 4 does not overflow.

These still image frames are processed by the first processing unit 4 and the compression decoding unit 5, and recorded in order on the recording medium 6 as the still image files. The compressed data of the still image frames, the charge storage times, the photographing times and the like are stored in these still image files.

Step S3: The first processing unit 4 performs inter-frame difference arithmetic between the still image frames which are continuously photographed, and detects an image motion amount between the still image frames based on the result of the inter-frame difference arithmetic.

Step S4: The control unit 10 shortens the setting of the charge storage time of the still image frame to be captured next as the image motion amount obtained from the first processing unit 4 becomes larger, in order to prevent blurring of the subject. This processing allows the fine still image frame having less blurring to be obtained.

Incidentally, when it is possible for the image sensor 1 to control the storage time for each pixel, the aforesaid processing may be applied only to the pixel corresponding to a partial area on an imaging surface in which the motion is detected.

In this case, a signal level of the motion area is smaller as compared to the area in which the motion is not detected, and hence level correction processing is applied to data of the motion area so as to make a correction thereto.

Step S5: The control unit 10 returns its operation to the step S2 and repeats the continuous photographing of the still image frame, until it receives the operation to complete the continuous photographing from the operation member 8 (release button).

Meanwhile, when receiving the operation to complete the continuous photographing, the control unit 10 completes the operation of the still image movie mode and moves its operation to the movie processing mode (described later) which generates movie image frame data with smooth motion from still image frame data obtained as above.

(Operation Explanation of Movie Processing Mode)

Figure 3:
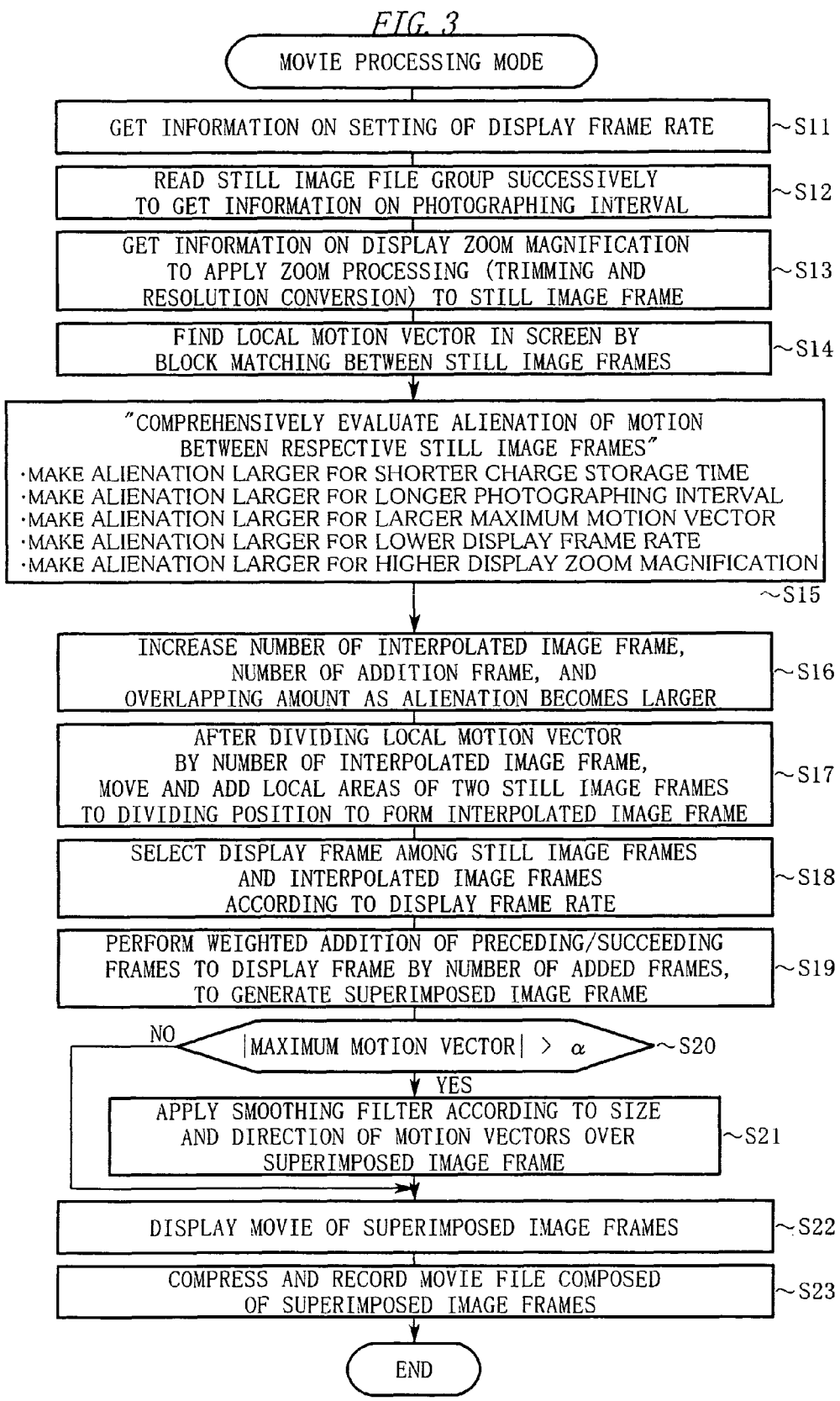
FIG. 3 is an operation flowchart of a movie processing mode.

FIG. 3 is an operation flowchart of the movie processing mode.

Hereinafter, the operation in the movie processing mode which is mainly performed by the second processing unit 11 will be explained according to step numbers shown in FIG. 3.

Step S11: The user can appropriately set a display frame rate of movie display of the display unit 12 in advance by using a custom setting function of the electronic camera 100. The second processing unit 11 gets the information on the setting of the display frame rate via the control unit 10.

When the display unit 12 is provided separately as the external device of the electronic camera 100, the control unit 10 gets this information through a connecting cable or the like to the display unit 12.

Step S12: The control unit 10 reads a still image file group (group of a series of the files photographed in the still image movie mode) in the recording medium 6 successively, and gives them to the compression decoding unit 5. The compression decoding unit 5 decodes the still image file group successively, and outputs a plurality of the still image frames to the second processing unit 11 in order.

The second processing unit 11 reads the photographing time of each still image frame from the file, to thereby get the information on a photographing interval between the still image frames.

Step S13: The user can change display zoom magnification at the time of displaying the movie on the display unit 12, by operating the operation member 8 of the electronic camera 100. The second processing unit 11 gets the information on the setting of the current display zoom magnification from the control unit 10.

Incidentally, when the display unit 12 is provided separately as the external device of the electronic camera 100, the control unit 10 can get this information through the connecting cable or the like to the display unit 12.

The second processing unit 11 applies zoom processing (trimming and resolution conversion) to the still image frames, according to the display zoom magnification.

Step S14: The second processing unit 11 performs block matching between temporally adjacent still image frames (hereinafter referred to as the preceding frame and the succeeding frame). In this case, the preceding frame is broken down into a plurality of blocks, and the area whose pattern is close to each block is searched from the succeeding block. FIG. 4A is a view showing an example of motion vectors for the respective blocks, which are found from this search.

Incidentally, thus-found motion vectors may be smoothed between the adjacent blocks to increase space continuity of the motion vectors. Moreover, the search may be performed near new endpoints of the motion vectors after the smoothing, so as to improve the accuracy of the motion vectors.

Further, as to the block whose motion vector changes quite discontinuously, it is preferable to further break down the block to generate new blocks, and find motion vectors for the respective blocks.

Step S15: Based on the information obtained thus far, the second processing unit 11 comprehensively evaluates alienation of the motion (awkwardness) AW between the still image frames, respectively, according to the following rules:

(1) the alienation is made larger as the charge storage time Tc becomes shorter;
(2) the alienation is made larger as the photographing interval Ti becomes longer;
(3) the alienation is made larger as the size of the maximum motion vector Mmax in the image area becomes larger;
(4) the alienation is made larger as the display frame rate DF becomes lower; and
(5) the alienation is made larger as the display zoom magnification DZ becomes higher.

For example, the alienation AW may be found by using the following evaluation equation.

$$AW = w1(1/Tc) + w2 \times Ti + w3 \times |Mmax| + w4(1/DF) + w5 \times DZ \quad \text{(Equation 1)}$$

Incidentally, w1 to w5 are coefficients showing the degree of effect given to the awkwardness of the motion by respective factors of the above (1) to (5) at the time of displaying the movie, and may be determined from an experiment and the like subjectively evaluating the awkwardness of the movie display.

Step S16: The second processing unit 11 sets the number of interpolated image frames and the number of added frames to increase as the alienation AW between the still image frames becomes larger. In concrete, the number of the interpolated image frames and the number of the added frames may be increased proportionally or monotonously according to the increase of the alienation AW. Alternatively, the number of the interpolated image frames and the number of the added frames may be increased in stages according to the increase of the alienation AW.

Step S17: The second processing unit 11 internally divides the local motion vector obtained by the block matching by the number of the interpolated image frames set in the step S16, and finds internally dividing positions (P1 and P2 shown in FIG. 4B) for each block.

FIG. 4B shows in three dimensions the relationship between the two frames of a still image frame K and a still image frame N which is succeedingly adjacent thereto in terms of time, and a motion vector V of a local area F in the still image frame K.

In this case, it is supposed that the aforementioned number of the interpolated image frames is two and interpolated image frames L and M are generated. In this example, the area F in the still image frame K moves to an area FN in the still image frame N which succeeds thereto in terms of time. It is the motion vector V that shows how the area F moves.

The interpolated image frames (L and M) are generated between the still image frame K and the still image frame N at equal time intervals.

Therefore, the positions of the local area F in the interpolated image frames L and M are intersections P1 and P2 between the motion vector V and the interpolated image frames L and M, respectively, as shown in FIG. 4B. Namely, P1 and P2 correspond to the internally dividing positions which are the motion vector V being internally divided according to the number of the interpolated image frames.

The second processing unit 11 extracts the local areas corresponding to start/end points F and FN of the motion vector V from the preceding/succeeding still image frames K and N, respectively, moves them to the internally dividing positions (P1 and P2, for example), and performs weighted addition according to internally dividing ratios (refer to FIG. 4B).

For example, in the example shown in FIG. 4B, the image data of the local area at the internally dividing position P1 is found by moving the local area F in the still image frame K and the local area FN in the still image frame N to the internally dividing position P1 in the interpolated image frame L, and adding the image data in both of the local areas at weighted ratios of 2/3 times and 1/3 times which correspond to the internally dividing ratios, respectively. Similarly, the image data of the local area at the internally dividing position P2 is found by moving the local area F in the still image frame K and the local area FN in the still image frame N to the internally dividing position P2 in the interpolated image frame M, and adding the image data in both of the local areas at weighted ratios of 1/3 times and 2/3 times which correspond to the internally dividing ratios, respectively.

By performing this weighted addition over the entire frame, it is possible to generate the interpolated image frames by which the motion between the preceding/succeeding still image frames is artificially divided.

When it is so structured that thus-generated interpolated image frames are recorded on the recording medium 6 together with the still image frames, superimposed image frames, which will be described later, can be generated without performing interpolated image frame generating processing, even when the alienation AW changes by changing the setting of the display frame rate, for example.

Step S18: The second processing unit 11 selects display frames to be the basis of the display at equal intervals among the still image frames which are obtained by the photographing and the interpolated image frames which are generated in the step S17, according to the information on the display frame rate obtained in the step S11.

Figure 5:
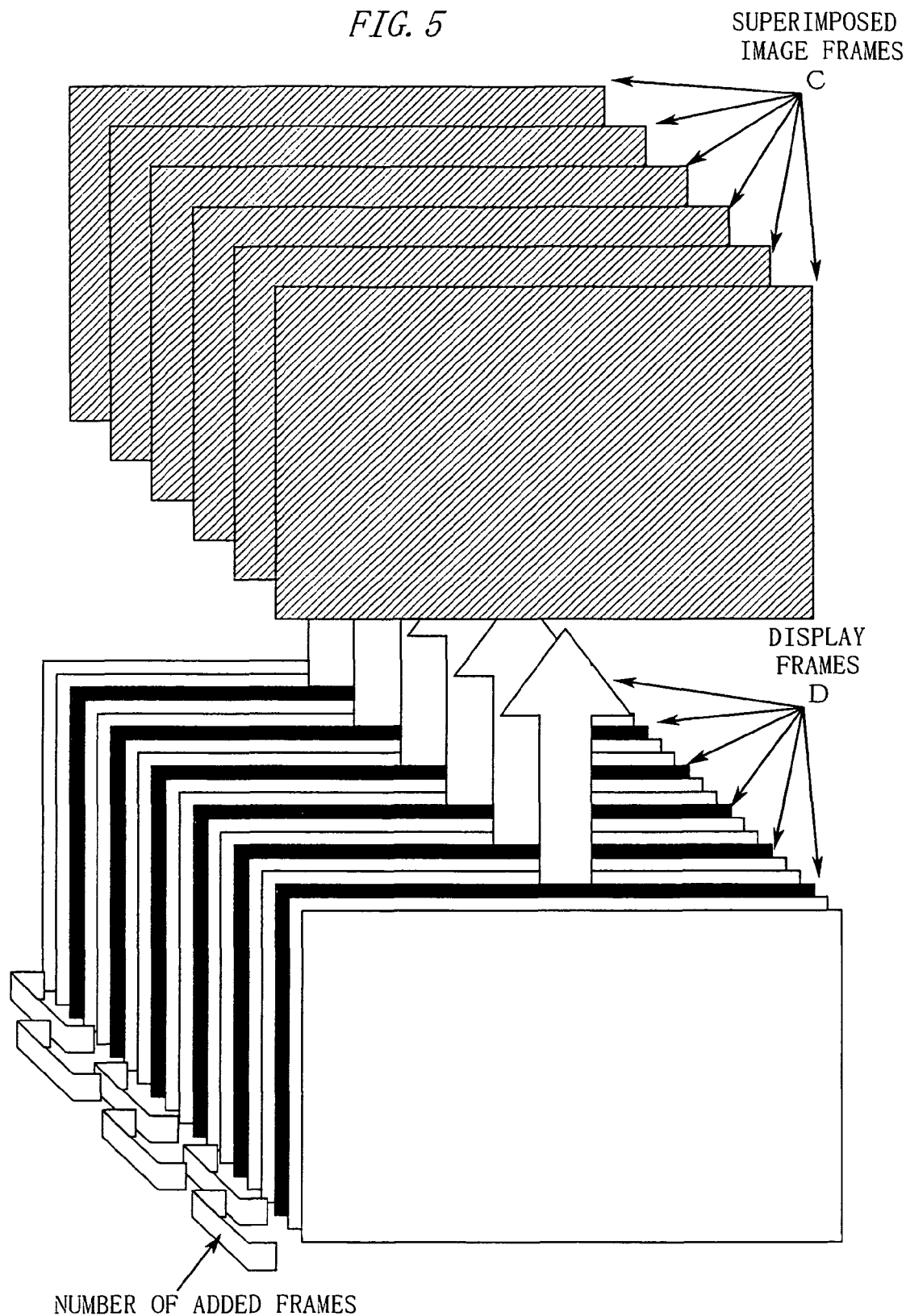
FIG. 5 is a view explaining a generating operation of superimposed image frames.

Display frames D shown in FIG. 5 are thus-selected display frames to be the basis of the display.

Step S19: The second processing unit 11 extracts the still image frames and/or the interpolated image frames which are temporally preceding/succeeding to the selected display frames to be the basis of the display by the number of the added frames found in the step S16, and performs moving-addition in the time-axis direction, to generate the superimposed image frames.

Incidentally, in generating the superimposed image frames, the frames which are moving-added to the display frames to be the basis of the display are not limited to the frames which are temporally preceding/succeeding to the display frames to be the basis of the display. Only the temporally preceding frames or only the temporally succeeding frames may be used.

Additionally, it is preferable that the weight ratio of the moving-addition is made larger in the display frame to be the basis of the display, and made smaller with distance from the display frame to be the basis of the display.

For example, in the example of FIG. 4B, when the number of the added frames is three and the display frame to be the basis of the display is M, the image data of the frames L, M and N are added at the weighted ratios of 1/4, 1/2 and 1/4, respectively, to obtain the superimposed image frame. Here, the number of the added frames is set larger as the alienation AW becomes larger in the step S16.

At this time, it is preferable that a linkage of the motion is established between the superimposed image frames by overlapping the added frames between the preceding/succeeding superimposed image frames.

For example, in the example of FIG. 4B, when the number of the added frames is five and the still image frames K and N are selected as the frames to be the basis of the display, the interpolated image frames L and M are used as the succeeding frames to be added to the frame K, and the interpolated image frames L and M are used as the preceding frames to be added to the frame N. Thus, the common frames (the interpolated image frames L and M in this case) are used in generating the superimposed image frames which are temporally adjacent to each other.

This means that, when displaying the superimposed image frames, the areas of the moving subject image are overlapped between the superimposed image frames which are temporally adjacent to each other. The larger the amount of the overlap, the smoother the motion appears.

In other words, it is preferable that the amount of the aforesaid overlap (the number of the frames to be used repeatedly in generating the superimposed image frames which are temporally adjacent to each other) is made larger as the alienation AW becomes larger. The amount of the overlap (the number of the frames) is set larger as the alienation AW becomes larger in the step S16.

The superimposed image frames C shown in FIG. 5 are thus-generated superimposed image frames.

The example of FIG. 5 shows how the superimposed image frames C are generated by adding the image data of the two frames before and after each of the display frames D selected as the basis of the display.

Step S20: The second processing unit 11 determines whether the size of the maximum motion vector |Mmax| in the image area is larger than a threshold value α or not. The threshold value α is the threshold value deciding whether or not dynamic expression of a moving line is added to one frame of the movie, and is decided from the viewpoints of naturalness of the movie expression, intension of the expression, and the like.

When the size |Mmax| is larger than the threshold value α, the second processing unit 11 moves its operation to a step S21.

Meanwhile, when the size |Mmax| is equal to or smaller than the threshold value α, the second processing unit 11 moves its operation to a step S22.

Step S21: The second processing unit 11 applies a smoothing filter according to the size and direction of the motion vectors over the superimposed image frame. This filter processing in the superimposed image frame allows the moving line expression according to the motion vectors to be added to the superimposed image frame.

It should be noted that, instead of the smoothing filter, the smoothing may be performed by removing high frequency components at the stage of applying compression coding to the superimposed image frame. In the case of the compression in the JPEG system, for example, the high frequency components can be removed by uniformly substituting high-frequency DCT coefficients with zero, or by increasing a high-frequency quantization step.

In the above example, the case of performing the filter processing in the superimposed image frame when the size of the maximum motion vector |Mmax| in the image area is larger than the predetermined threshold value α is explained. However, filter processing characteristics in the superimposed image frame may be changed continuously according to the size of the maximum motion vector |Mmax|.

In this case as well, the filter processing characteristics are changed so that the lower frequency is cut off according to high-frequency cutoff characteristics of the filter in the superimposed image frame as the size of the maximum motion vector |Mmax| becomes larger.

Additionally, the filter processing characteristics can be changed so that a high spatial frequency cutoff amount of the smoothing filter increases as the size of the maximum motion vector |Mmax| becomes larger.

Step S22: The second processing unit 11 displays the movie on the display unit 12 by storing a group of the complete superimposed image frames in a not-shown display buffer and the like.

Step S23: The second processing unit 11 gives the group of the complete superimposed image frames to the compression decoding unit 5. The compression decoding unit 5 applies the compression coding to the group of the superimposed image frames, generates the movie file, and records it on the recording medium 6.

By the processing described thus far, high spatial frequency components in the superimposed image frame are suppressed as the alienation of the motion between the still image frames becomes larger. As a result of this, it is possible to generate the superimposed image frames (movie file) by which the smooth movie display is possible.

Incidentally, in this embodiment, the case of generating the superimposed image frame by performing the moving addition of the still image frames and the interpolated image frames, mainly, in the time-axis direction is explained. However, the superimposed image frame may be generated by adding the plural interpolated image frames with each other in the time-axis direction.

(Effects and the Like of this Embodiment)

Next, the effects of this embodiment will be explained.

(1) First, the image processing apparatus of this embodiment takes in the plural still image frames which are obtained by photographing the still images. Next, the image processing apparatus applies interpolation between the still image frames in the time-axis direction, to generate the interpolated image frame. The image processing apparatus performs the moving addition of "the still image frame and the interpolated image frame" or "the plural interpolated image frames with each other" in the time-axis direction, to generate the superimposed image frame.

In each of the superimposed image frames, the images (motion) whose photographing intervals are artificially shortened by interpolation processing are superimposed. By this superimposition, artificial image flow is added to the superimposed image frames, and the alienation of the motion is reduced. As a result of this, smooth reproduction of the movie is made possible by using these superimposed image frames to reproduce the movie.

Further, according to this embodiment, the alienation of the motion is found between the still image frames, and the superimposed image frames are made smoother as the alienation becomes larger. This processing allows the movie to be reproduced further smoother.

(2) It should be noted that, when the charge storage time at the time of photographing the still image frame becomes longer, the image flow of the moving subject becomes larger. The natural image flow of the still image frames reduces the awkwardness of the motion. On the contrary, when the charge storage time of the still image frame becomes shorter, the image flow becomes smaller to thereby cause big skips in the motion and the awkwardness of the motion.

Therefore, according to this embodiment, the high spatial frequency components in the superimposed image frame are suppressed as the charge storage time at the time of photographing the still image frame becomes shorter. By suppressing the high spatial frequency components, the artificial image flow of the superimposed image frames becomes larger, which makes it possible to improve the awkwardness of the motion accompanying the shortened charge storage time.

(3) Moreover, when the photographing interval becomes longer, the positions of the moving subject are separated between the frames, to thereby cause the awkwardness of the motion. Therefore, according to this embodiment, the high spatial frequency components in the superimposed image frame are suppressed as the photographing interval of the still image frame becomes longer. By suppressing the high spatial frequency components, the artificial image flow of the superimposed image frames becomes larger, which makes it possible to improve the awkwardness of the motion accompanying the enlarged photographing interval.

(4) Meanwhile, when the motion of the subject is fast, the positions of the moving subject are separated between the frames, to thereby cause the awkwardness of the motion. Therefore, according to this embodiment, the high spatial frequency components in the superimposed image frame are suppressed as a moving amount (motion amount) of the image becomes larger between the still image frames. By suppressing the high spatial frequency components, the artificial image flow of the superimposed image frames becomes larger, which makes it possible to improve the awkwardness of the motion accompanying the fast movement of the subject.

(5) Incidentally, when the subject in the image area is small and the motion is detected in only one place, there is the possibility that the fast movement of the subject cannot be detected. Therefore, according to this embodiment, the motion is found from a plurality of the places in the image area, and the maximum motion amount is detected among these. This processing can improve the awkwardness of the motion accompanying the fast movement of the subject without fail.

(6) Incidentally, as the method of suppressing the high spatial frequency components in the superimposed image frame, it is preferable to increase the number of the frames of the interpolated image frames. Then, the image flow which appears artificially in the superimposed image frames can be made smooth.

(7) Additionally, as the method of suppressing the high spatial frequency components in the superimposed image frame, it is also preferable to increase the number of the frames to be moving added. Then, the image flow which appears artificially in the superimposed image frames can be made larger.

(8) Incidentally, it is preferable to apply smoothing filter over a superimposed image frame, In this case, the high-frequency cutoff characteristic of the smoothing filter is strengthened as alienation of motion becomes larger. Particularly, in (7) referenced above, multi-image tends to be eye-catching in the superimposed frame. This multi-image can be changed into natural image flow by smoothing.

(9) Further, it is preferable to match the smoothing direction of smoothing filter to the direction of the motion vector.

(10) Further, according to this embodiment, it is preferable to commonly use the still image frame or the interpolated image frame when generating the superimposed image frames which are temporally adjacent to each other. This processing gives an afterimage between the superimposed image frames, to thereby increase the smoothness of the movie display.

(11) Additionally, according to this embodiment, it is preferable to increase the number of the still image frame or the interpolated image frame to be used commonly when generating the superimposed image frames which are temporally adjacent to each other. Then, it is possible to suppress the high spatial frequency components in the superimposed image frame and to increase the smoothness of the movie display.

(12) Furthermore, according to this embodiment, it is preferable to record the complete movie as the movie image file.

(13) Further, it is preferable to suppress the high spatial frequency components when compressing the movie image file. By doing so, the smoothness of the movie display can be increased.

(14) Incidentally, the low display frame rate of the movie display also causes the skips in the motion of the subject and the awkwardness of the motion. Therefore, according to this embodiment, the high spatial frequency components in the superimposed image frame are suppressed as the display frame rate of the movie display becomes lower. By suppressing the high spatial frequency components, the artificial image flow of the superimposed image frames becomes larger, which makes it possible to improve the awkwardness of the motion accompanying the insufficient display frame rate.

(15) Incidentally, it is also preferable to apply smoothing filter that performs smoothing on a direction of the motion vector over the superimposed image frame. In this case, as alienation of motion becomes larger, the multi-image that appears on the superimposed image frame can be turned into image having a natural direction by strengthening the high-frequency characteristic of the smoothing filter.

(16) Moreover, as the display zoom magnification of the movie display becomes higher, a motion width of the subject increases and the awkwardness is caused in the motion. Therefore, according to this embodiment, the high spatial frequency components in the superimposed image frame are suppressed as the display zoom magnification of the movie display becomes higher. By suppressing the high spatial frequency components, the artificial image flow of the superimposed image frames becomes larger, which makes it possible to improve the awkwardness of the motion accompanying the change in the magnification of the display.

(Supplementary Items of this Embodiment)

Incidentally, according to this embodiment, the still image frames are temporarily recorded and then the superimposed image frames (movie file) are generated by postprocessing. However, this embodiment is not limited to the above. For example, the still image frames outputted from the first processing unit 4 may be given to the second processing unit 11 to thereby generate the superimposed image frames (movie file) directly.

Further, according to this embodiment, the explanation about the electronic camera 100 has been given. However, this embodiment is not limited to the above. For example, the processing operation shown in FIG. 3 may be programmed and the computer may execute the program.

Furthermore, by using the method of the image processing of this embodiment in a server machine on the Internet and the like, it is possible to provide image processing service such as an electronic album.

The invention is not limited to the above embodiments and various modifications may be made without departing from the spirit and scope of the invention. Any improvement may be made in part or all of the components.

What is claimed is:

1. An image processing apparatus executing preprocessing to smoothly perform a movie display of image data composed of a plurality of still image frames obtained by still-image photographing, comprising:
   an image inputting unit importing said still image frames;
   a frame interpolating unit applying frame interpolation to said still image frames in time-axis direction in order of photographing, to generate one or more interpolated image frames;
   a combining unit performing moving addition of one of still image frames and one of said interpolated image frames or one of said interpolated image frames and another one of said interpolated image frames in said time-axis direction, to generate one or more composite image frames;

a smoothing unit controlling smoothness of said movie display by controlling, among said still image frames and/or said interpolated image frames which are temporally preceding/succeeding, the number of still image frames and/or interpolated image frames, to be used when generating said composite image frames and by controlling more high spatial frequency components in said composite image frames; and a recording control unit recording said composite image frames being generated, wherein when the number of still images and/or interpolated image frames to be used when generating said composite image frames increases, said smoothing unit changes a processing characteristics of a smoothing filter corresponding to said composite frame either by cutting off of lower frequencies in a high-frequency cutoff characteristic of said smoothing filter performing smoothing on said composite image frames generated by said moving addition in a direction of a motion between frames other than said composite image frames, or by increasing a high spatial frequency cutoff amount of said smoothing filter in said composite image frame.

2. The image processing apparatus according to claim 1, wherein said smoothing unit controls the combining unit to increase, among said still image frames and/or said interpolated image frames which are temporally preceding/succeeding, the number of still image frames and/or interpolated image frames to be used when generating said composite image frames as alienation of motion between said still image frames becomes larger.

3. The image processing apparatus according to claim 1, wherein said smoothing unit controls the combining unit to increase, among said still image frames and/or said interpolated image frames which are temporally preceding/succeeding, the number of still image frames and/or interpolated image frames to be used when generating said composite image frames as display rate of said movie display becomes lower.

4. The image processing apparatus according to claim 1, wherein said smoothing unit controls the combining unit to increase, among said still image frames and/or said interpolated image frames which are temporally preceding/succeeding, the number of still image frames and/or interpolated image frames to be used when generating said composite image frames as display zoom magnification of said movie display becomes higher.

5. The image processing apparatus according to claim 1, wherein said combining unit performs moving addition in direction of time-axis by assigning weights to still image frames and/or interpolated image frames to be used when generating said composite frames.

6. A non-transitory computer readable medium storing a computer readable program executable by a computer for causing the computer to execute preprocessing to smoothly perform a movie display of image data composed of a plurality of still image frames obtained by still-image photographing, the preprocessing comprising:

importing said still image frames;

applying frame interpolation to said still image frames in time-axis direction in order of photographing, to generate one or more interpolated image frames;

performing moving addition of one of still image frames and one of said interpolated image frames or one of said interpolated image frames and another one of said interpolated image frames in said time-axis direction, to generate one or more composite image frames; and controlling smoothness of said movie display by controlling, among said still image frames and/or said interpolated image frames which are temporally preceding/succeeding, the number of still image frames and/or interpolated image frames to be used when generating said composite image frames and by controlling more high spatial frequency components in said composite image frames, wherein when the number of still images and/or interpolated image frames to be used when generating said composite image frames increases, the preprocessing further changes a processing characteristics of said smoothing filter corresponding to said composite frame either by cutting off of lower frequencies in a high-frequency cutoff characteristic of said smoothing filter performing smoothing on said composite image frames generated by said moving addition in a direction of a motion between frames other than said composite image frames, or by increasing a high spatial frequency cutoff amount of said smoothing filter in said composite image frame.

7. The non-transitory computer readable medium according to claim 6, wherein said controlling smoothness includes increasing, among said still image frames and/or said interpolated image frames which are temporally preceding/succeeding, the number of still image frames and/or interpolated image frames to be used when generating said composite image frames as alienation of motion between said still image frames becomes larger.

8. The non-transitory computer readable medium according to claim 6, wherein said controlling smoothness includes increasing, among said still image frames and/or said interpolated image frames which are temporally preceding/succeeding, the number of still image frames and/or interpolated image frames to be used when generating said composite image frames as display rate of said movie display becomes lower.

9. The non-transitory computer readable medium according to claim 6, wherein said controlling smoothness includes increasing, among said still image frames and/or said interpolated image frames which are temporally preceding/succeeding, the number of still image frames and/or interpolated image frames to be used when generating said composite image frames as display zoom magnification of said movie display becomes higher.

* * * * *